(12) United States Patent
Louis (10) Patent No.: US 10,704,630 B2
(45) Date of Patent: Jul. 7, 2020

(54) AUTOMATIC SLACK ADJUSTER WITH ADJUSTING CLUTCH IN CONTROL TRAIN

(71) Applicant: Bendix Spicer Foundation Brake LLC, Elyria, OH (US)

(72) Inventor: John M. Louis, North Ridgeville, OH (US)

(73) Assignee: Bendix Spicer Foundation Brake LLC, Elyria, OH (US)

(*) Notice: Subject to any disclaimer, the term of this patent is extended or adjusted under 35 U.S.C. 154(b) by 0 days.

(21) Appl. No.: 15/978,786

(22) Filed: May 14, 2018

(65) Prior Publication Data

US 2019/0345998 A1 Nov. 14, 2019

(51) Int. Cl.
*F16D 65/58* (2006.01)
*F16H 1/16* (2006.01)

(52) U.S. Cl.
CPC .............. *F16D 65/58* (2013.01); *F16H 1/16* (2013.01)

(58) Field of Classification Search
CPC ............. F16D 65/58; F16D 65/60; F16H 1/16
USPC ................................. 188/196 R, 196 F, 79.55
See application file for complete search history.

(56) References Cited

U.S. PATENT DOCUMENTS

| | | | |
|---|---|---|---|
| 4,561,523 A | 12/1985 | Ott | |
| 5,327,999 A * | 7/1994 | Nelander | F16D 65/60 188/79.55 |
| 7,708,122 B2 | 5/2010 | Plantan et al. | |
| 8,245,820 B2 | 8/2012 | Echambadi et al. | |
| 8,302,742 B2 | 11/2012 | Louis et al. | |
| 8,302,744 B2 | 11/2012 | Louis | |
| 8,602,188 B2 | 12/2013 | Louis | |
| 8,973,722 B2 | 3/2015 | Kromer et al. | |
| 2007/0137354 A1 * | 6/2007 | Botalenko | F16D 65/60 74/425 |
| 2010/0018812 A1 * | 1/2010 | Louis | F16D 65/60 188/71.2 |
| 2010/0122878 A1 * | 5/2010 | Louis | B60T 7/108 188/79.55 |

(Continued)

OTHER PUBLICATIONS

Bendix Commercial Vehicle Systems LLC, "Bendix ASA-5 Automatic Slack Adjuster," Service Data Sheet SD-05-1269 (2011).

(Continued)

*Primary Examiner* — Robert A. Siconolfi
*Assistant Examiner* — San M Aung
(74) *Attorney, Agent, or Firm* — Reising Ethington P.C.

(57) ABSTRACT

A vehicle brake slack adjuster includes a housing coupled to a brake actuator and supporting a driving worm wheel engaging the brake cam shaft and a driving worm screw meshed with the driving worm wheel and transferring a brake actuating force, imparted by the brake actuator to the housing, to the driving worm wheel and cam shaft. The adjuster further includes a wear adjustment mechanism including a reference arm fixed against movement and including a control ring gear, a pinion gear meshed with the control ring gear and configured for rotation about an axis, a clutch ring disposed about the axis and configured for rotation with the pinion gear, a control worm screw disposed about the axis, a wrap spring engaging surfaces of the clutch ring and control worm screw and a control worm wheel meshed with the control worm screw and configured for rotation with the driving worm screw.

15 Claims, 4 Drawing Sheets

(56) References Cited

U.S. PATENT DOCUMENTS

| | | | |
|---|---|---|---|
| 2014/0216865 A1* | 8/2014 | Gripemark | F16D 65/60 188/79.55 |
| 2016/0333952 A1 | 11/2016 | Keller et al. | |
| 2018/0038433 A1* | 2/2018 | Drake | B60T 7/108 |

OTHER PUBLICATIONS

Bendix Commercial Vehicle Systems LLC, "Bendix Versajust Automatic Slack Adjuster," Service Data Sheet SD-05-4630 (2011).

* cited by examiner

AUTOMATIC SLACK ADJUSTER WITH ADJUSTING CLUTCH IN CONTROL TRAIN

BACKGROUND OF THE INVENTION a. Field of the Invention

This invention relates to automatic slack adjusters for vehicle brakes. In particular, the invention relates to an automatic slack adjuster having a wear adjustment mechanism configured to simplify the design of the slack adjuster, to incur reduced loads, and to enable continuous, as opposed to discrete, adjustment.

b. Background Art

In conventional vehicle brakes, a brake actuator moves friction linings into engagement with a friction surface to brake rotation of a wheel. Over time, the friction linings exhibit wear and the distance between the friction linings and the friction surface increases. As a result, the brake actuator has to continually increase its range of motion to move the friction linings into engagement with the friction surface. In order to reduce or eliminate this excess motion, slack adjusters may be placed in the mechanical path between the brake actuator and the friction linings. The slack adjuster transfers actuating forces from the brake actuator to the friction linings, but also adjusts the position of the friction linings relative to the friction surface in order to maintain a predetermined clearance between the friction linings and friction surface despite wear on the friction linings. In a conventional drum brake, for example, a slack adjuster may be located between the brake actuator and a cam shaft that moves one or more brake shoes having friction linings into engagement with the surface of a brake drum. The slack adjuster may have a housing coupled to a push rod extending from the brake actuator and may be configured to receive and engage the cam shaft such that linear motion of the push rod is translated into rotational motion of the slack adjuster housing and cam shaft. When the brake is released, if the clearance between the friction linings and friction surface is greater than a predetermined clearance, the slack adjuster is permitted to rotate relative to the cam shaft for an angular distance corresponding to the excess clearance in order to limit the distance the friction linings are withdrawn from the friction surface and maintain the predetermined clearance.

In order to allow the slack adjuster to transfer brake actuating forces from the brake actuator to the cam shaft or another structure, but also move relative to that structure when adjusting the clearance between the friction linings and friction surface, the slack adjuster typically includes a one-way clutch. In slack adjusters for drum brakes, a toothed clutch is commonly located between (i) a driving worm screw that engages a driving worm wheel coupled to the brake cam shaft and (ii) a control worm wheel in the wear adjustment mechanism disposed about the same rotational axis as the driving worm screw. The location of the one-way clutch between the driving worm screw and control worm wheel creates design and manufacturing complexities for the slack adjuster and places relatively significant loads on the clutch components. In addition, the toothed clutch permits only discrete adjustments that limit the ability to adjust the clearance between the friction linings and friction surface.

The inventor herein has recognized a need for an automatic slack adjuster for a vehicle brake that will minimize and/or eliminate one or more of the above-identified deficiencies.

BRIEF SUMMARY OF THE INVENTION

This invention relates to automatic slack adjusters for vehicle brakes. In particular, the invention relates to an automatic slack adjuster having a wear adjustment mechanism configured to simplify the design of the slack adjuster, to incur reduced loads, and to enable continuous, as opposed to discrete, adjustment.

An automatic slack adjuster for a vehicle brake in accordance with one embodiment includes a housing configured for coupling to a brake actuator. The adjuster further includes a driving worm wheel supported by the housing and configured to engage a brake cam shaft of the vehicle brake. The adjuster further includes a driving worm screw supported by the housing and in mesh with the driving worm wheel. The driving worm screw is configured to transfer a brake actuating force, imparted by the brake actuator to the housing, to the driving worm wheel and brake cam shaft. The adjuster further includes a wear adjustment mechanism. The wear adjustment mechanism includes a reference arm assembly configured to be fixed against movement and including a control ring gear. The wear adjustment mechanism further includes a pinion gear in mesh with the control ring gear and configured for rotation about a rotational axis. The pinion gear defines a first angular drive face. The wear adjustment mechanism further includes a clutch ring disposed about the rotational axis and configured for rotation with the pinion gear. The clutch ring defines a second angular drive face disposed within a common plane with the first angular drive face of the pinion gear and spaced from the first angular drive face of the pinion gear by an angular gap corresponding to a predetermined clearance between a friction lining of the vehicle brake and a friction surface of the vehicle brake. The wear adjustment mechanism further includes a control worm screw disposed about the rotational axis, a wrap spring engaging surfaces of the clutch ring and control worm screw and a control worm wheel in mesh with the control worm screw and configured for rotation with the driving worm screw.

An automatic slack adjuster for a vehicle brake in accordance with another embodiment includes a housing configured for coupling to a brake actuator. The adjuster further includes a driving worm wheel supported by the housing and configured to engage a brake cam shaft of the vehicle brake. The adjuster further includes a driving worm screw supported by the housing and in mesh with the driving worm wheel. The driving worm screw is configured to transfer a brake actuating force, imparted by the brake actuator to the housing, to the driving worm wheel and brake cam shaft. The adjuster further includes means for adjusting a position of the driving worm wheel to compensate for wear in the vehicle brake.

An automatic slack adjuster for a vehicle brake in accordance with the invention represents an improvement as compared to conventional slack adjusters. In particular, the inventive slack adjuster locates the one-way clutch in a part of the wear adjustment mechanism of the slack adjuster distant from the interface between the driving worm screw and control worm wheel of the adjustment mechanism. As a result, design and manufacturing of the slack adjuster is simplified and loads on the clutch are reduced. Further, the use of a wrap spring in place of a toothed clutch allows for continuous adjustment as opposed to discrete adjustments as in conventional slack adjusters.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
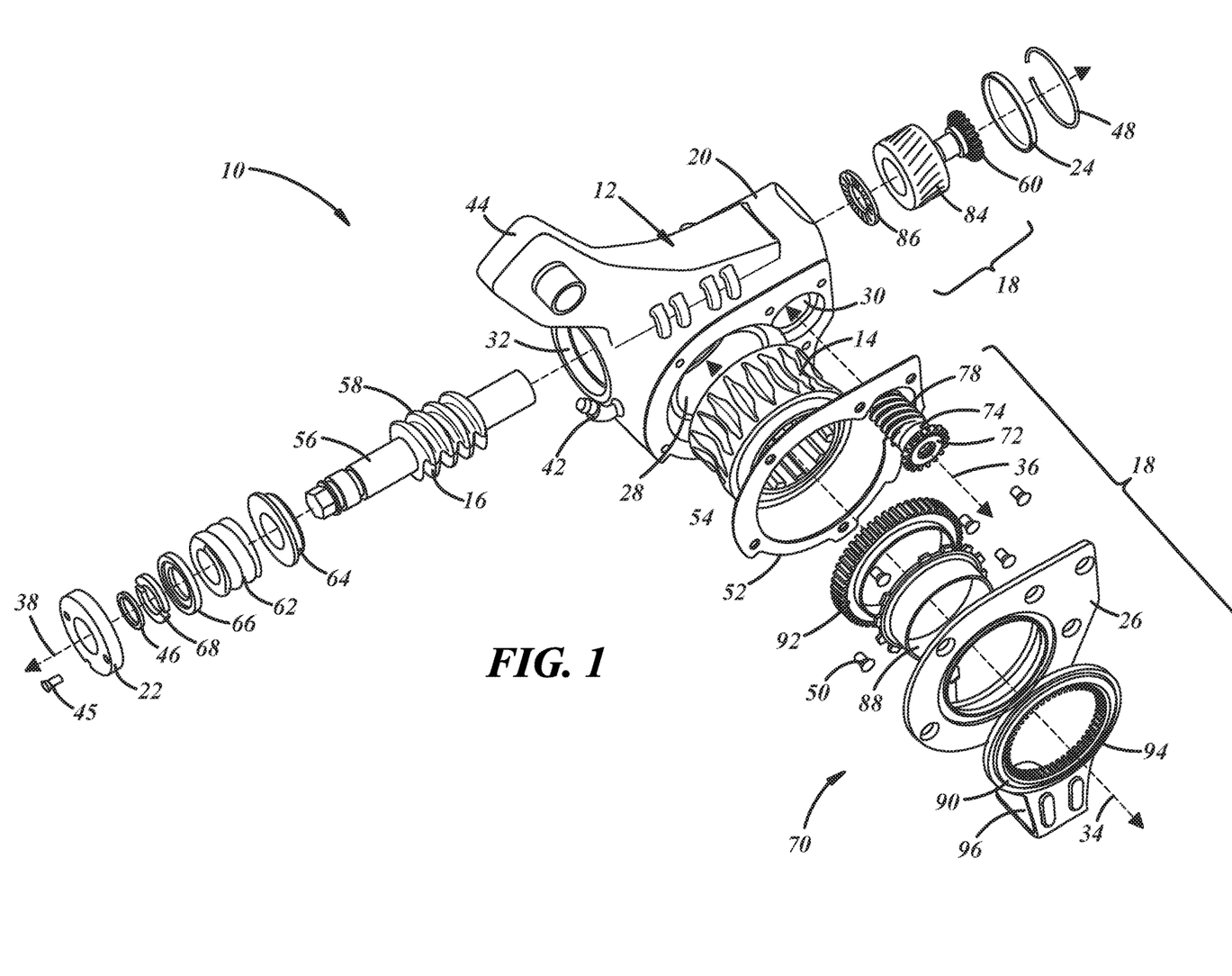
FIG. 1 is an exploded view of an automatic slack adjuster in accordance with one embodiment of the present teachings.

Referring now to the drawings wherein like reference numerals are used to identify identical components in the various views, FIG. 1 illustrates an automatic slack adjuster 10, or brake lever, for a vehicle brake in accordance with one embodiment of the present teachings. Adjuster 10 is provided to transmit forces from a brake actuator to a brake cam shaft and to adjust the distance between the friction linings of the brake and a friction surface to maintain a predetermined clearance between the friction linings and friction surface. Adjuster 10 is particularly configured for use with vehicle drum brakes on heavy commercial vehicles such as trucks, trailers and buses in which an S-cam at one end of a cam shaft is rotated to move a pair of brake shoes carrying friction linings into and out of engagement with a brake drum. It should be understood, however, that assembly 10 may find application on a wide variety of vehicles. Assembly 10 may include a housing 12, a driving worm wheel 14, a driving worm screw 16 and means, such as wear adjustment mechanism 18, for adjusting a position of the driving worm wheel 14 to compensate for wear in the vehicle brake friction linings.

Figure 2:
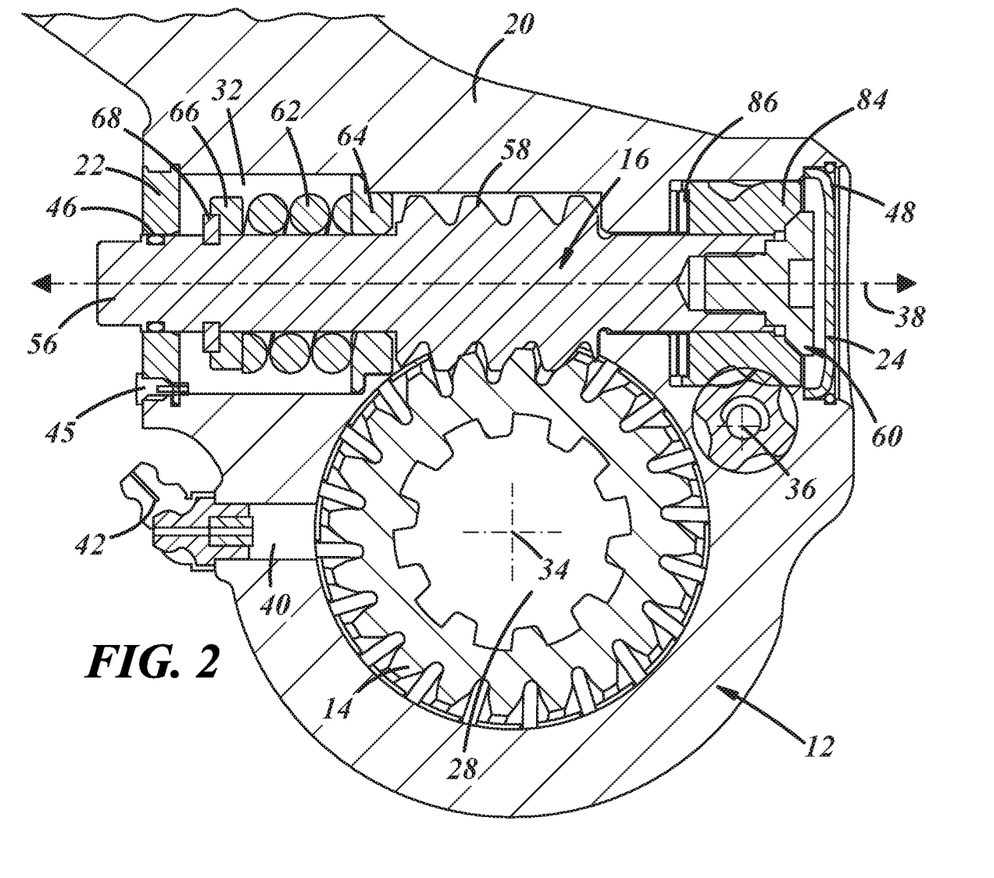
FIG. 2 is a cross-sectional view of the automatic slack adjuster of FIG. 1.

Housing 12 is provided to position and orient the other components of slack adjuster 10, protect those components from foreign objects and elements, and to transfer brake actuating forces from a brake actuator. Housing 12 may include a body 20 and several cover plates 22, 24, 26 configured to close openings in housing 12. Body 20 supports, positions and orients the other components of slack adjuster 10. Body 20 defines three longitudinal bores 28, 30, 32 extending along, and centered about, three distinct axes 34, 36, 38. Bore 28 is a closed bore disposed about axis 34 and is configured to receive driving worm wheel 14 among other components. Bore 30 is a closed bore disposed about axis 36 and is configured to receive components of wear adjustment mechanism 18. Axis 36 extends in a direction parallel to axis 34. Bore 32 is a through bore disposed about axis 38 and is configured to receive driving worm screw 16 and additional components of wear adjustment mechanism 18 among other components. Axis 38 extends in a direction that is generally perpendicular to the direction of axes 32, 34. Referring to FIG. 2, body 20 may further define a lubricant passage 40 extending from bore 28 through which grease or other lubricants may be provided using a zerk or nipple 42 located at one end of passage 40. Referring again to FIG. 1, body 20 further defines an arm 44 that may be configured to engage one end of a push rod extending from a brake actuator. Linear movement of the pushrod acting on arm 44 causes rotation of housing 12 that is translated into rotational movement of the brake cam shaft through driving worm wheel 14 and driving worm screw 16. Cover plates 22, 24 are configured to close opposite longitudinal ends of bore 32. Cover plate 22 may be secured to body 20 using one or more fasteners 45 such as bolts or screws. Cover plate 22 includes a central aperture configured to receive one end of driving worm screw 16. A seal 46 may be disposed between driving worm screw 16 and cover plate 22. Cover plate 24 may be secured to housing 12 using a snap ring 48. Cover plate 26 is configured to close bore 30. Cover plate 26 may be secured to body 20 using one or more fasteners 50 such as bolts or screws and a gasket 52 may be disposed between cover plate 26 and body 20.

Driving worm wheel 14 is provided to transfer brake actuating forces to a brake cam shaft. Wheel 14 is configured to be received within bore 28 and may be disposed about, and centered about, axis 34. Wheel 14 may define one or more keys/keyways or splines on a radially inner surface configured to engage mating keyways/keys or splines on the brake cam shaft to rotatably couple wheel 14 and the cam shaft. Wheel 14 defines one or more teeth on a radially outer surface configured to mesh with driving worm screw 16. In the illustrated embodiment wheel 14 comprises a throated or enveloping worm wheel 14 in which the teeth increase in diameter moving from a longitudinal center of each tooth towards the longitudinal ends of the tooth. Wheel 14 may further define circular grooves 54 at either end of wheel 14 configured to receive seals.

Driving worm screw 16 transfers brake actuating forces from housing 12 to worm wheel 14. Screw 16 is configured to be received within bore 32 and may be disposed about, and centered about, axis 38. Screw 16 includes a body 56 and one or more helical threads 58 disposed about a portion of body 56 intermediate the longitudinal ends of body 56. Threads 58 are in mesh with the teeth of worm wheel 14. Referring to FIG. 2, one longitudinal end of screw 16 may be configured to receive a fastener 60. Fastener 60 is used to position components of wear adjustment mechanism 18 and comprises one element of a clutch formed with elements of wear adjustment mechanism 18 as described in greater detail below. The opposite longitudinal end of screw 16 extends through cover plate 22 and may define one or more flats configured to allow screw 16 to be gripped by a tool and through which screw 16 may be manually rotated to adjust the position of worm wheel 14 and the brake cam shaft. Screw 16 extends through and supports a spring 62 and a pair of spring seats 64, 66 disposed on either side of spring 62. Seat 64 is disposed between spring 62 and threads 58 on worm screw 16 and abuts a shoulder formed in bore 32. Seat 66 is disposed on the opposite side of spring 62 and is retained on worm screw 16 by a split ring 68 disposed within a groove formed in worm screw 16. Spring 62 biases worm screw 16 in one direction along axis 38 (to the left in FIG. 2) to engage a clutch formed between fastener 60 and elements of wear adjustment mechanism 18 as described in greater detail below. Spring 62 may comprise a heavy coil spring or stack of disc springs.

Figure 3:
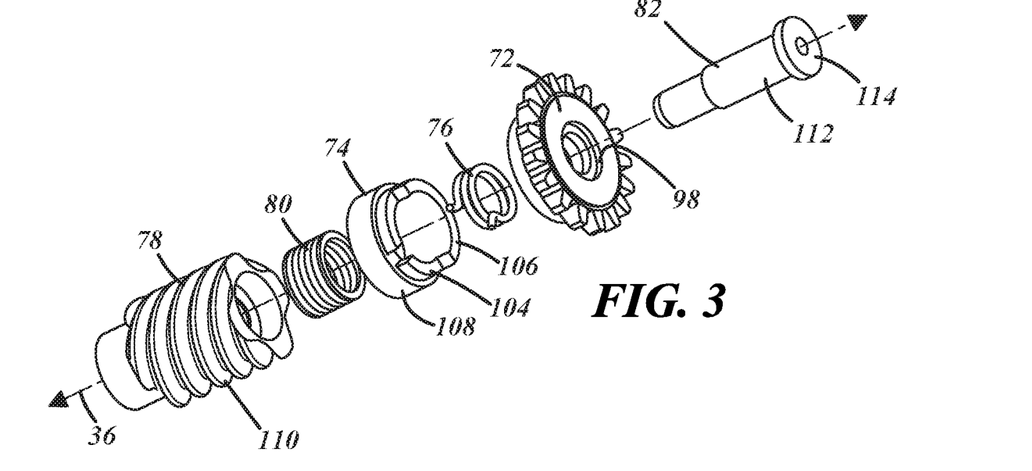
FIGS. 3-4 are exploded views of a portion of a wear adjustment mechanism of the automatic slack adjuster of FIG. 1.
Figure 4:
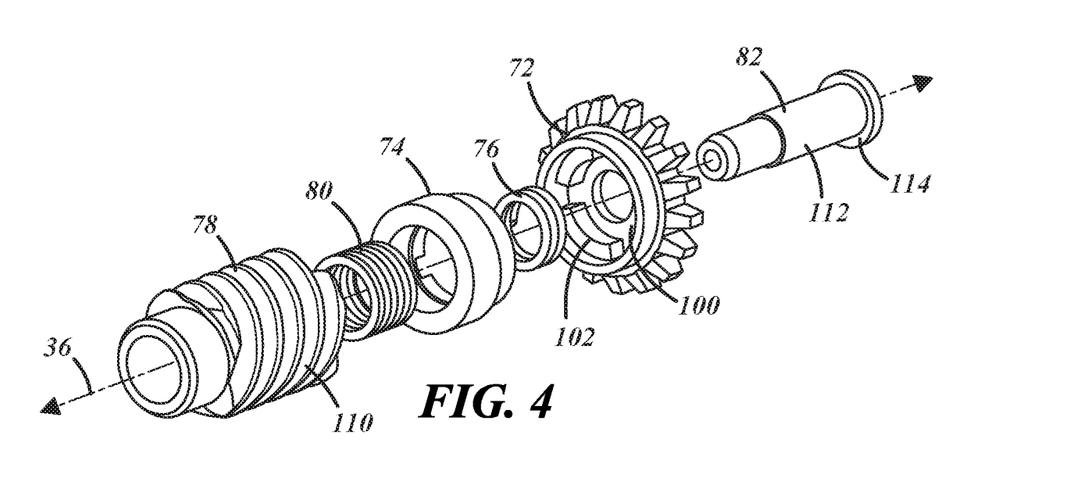
Figure 5:
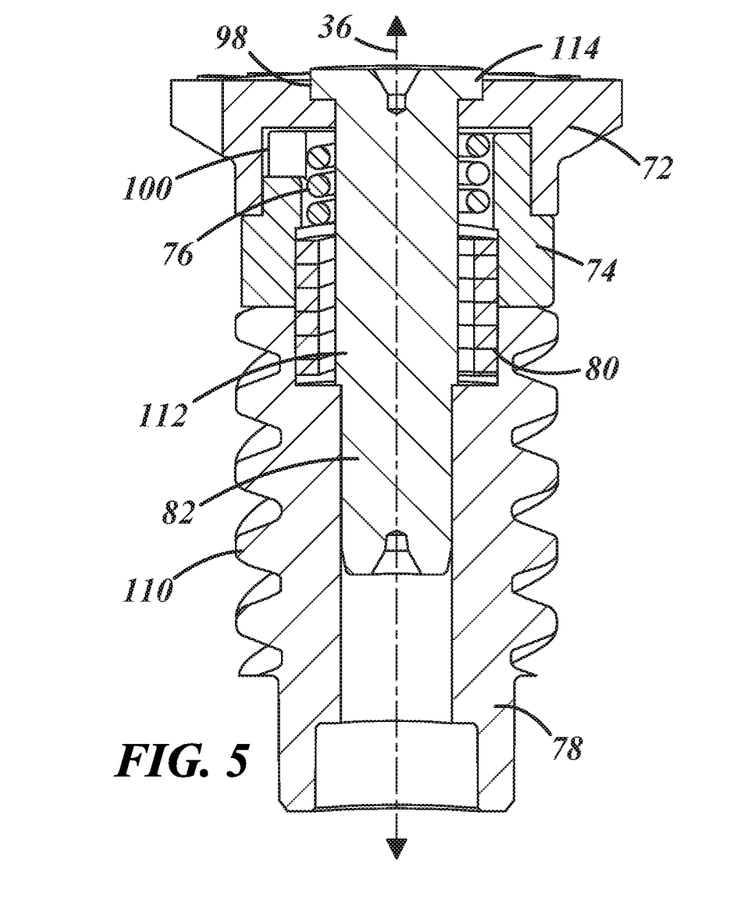
FIG. 5 is a cross-sectional view of the portion of the wear adjustment mechanism shown in FIGS. 3-4.

Wear adjustment mechanism 18 provides a means for adjusting a position of the driving worm wheel 14, and therefore the brake cam shaft and friction linings, to compensate for wear in the friction linings. Adjustment mechanism 18 may include a reference arm assembly 70. Referring to FIGS. 3-5, mechanism 18 may also include a pinion gear 72, a clutch ring 74, a torsion spring 76, a control worm screw 78, a wrap spring 80, and a fastener 82. Referring to FIGS. 1-2, mechanism 18 may further include a control worm wheel 84 and a thrust bearing 86.

Referring to FIG. 1, reference arm assembly 70 provides a fixed reference point used in adjusting the position of slack adjuster 12 to compensate for wear in the brake linings. Assembly 70 may include a support sleeve 88, a reference arm 90, and a control ring gear 92. Sleeve 88 supports reference arm 90 and ring gear 92 and couples arm 90 and gear 92 for rotation together with sleeve 88. Sleeve 88 includes a cylindrical body configured to support reference arm 90 and ring gear 92 and defines a radially outwardly extending flange at one end having a plurality of teeth configured to be received within corresponding cavities in ring gear 92 to prevent relative movement between sleeve 88 and ring gear 92. Reference arm 90 includes an annular body 94 and a mounting flange 96 extending from body 94 that is secured to a fixed point on the vehicle chassis such as the vehicle axle. Body 94 includes a plurality of teeth on a radially inner surface configured to engage a radially outer surface of the cylindrical body of sleeve 88 in order to couple reference arm 90 to sleeve 88 and prevent relative movement between arm 90 and sleeve 88 (the teeth on body 94 of arm 90 may be made of a softer material than the material of sleeve 88 such that the teeth deform as sleeve 88 is inserted through arm 90 to securely couple arm 90 to sleeve 88). Ring gear 92 is annular in shape and includes a plurality of teeth on a radially outer surface configured to mesh with teeth on pinion gear 72.

Referring to FIGS. 3-5, pinion gear 72 drives clutch ring 74. Pinion gear 72 is disposed with bore 30 in housing 12. Pinion gear 72 may be disposed about, and centered about, axis 36 and may be fixed again movement along axis 36. Pinion gear 72 defines a plurality of teeth on a radially outer surface that mesh with corresponding teeth on control ring gear 92. Pinion gear 72 is annular in shape and has an inner diameter that varies along the length of pinion gear 72. Referring to FIG. 5, the inner diameter of pinion gear 72 is at its smallest intermediate the longitudinal ends of pinion gear 72 and is sized to receive a shank of fastener 82. The inner diameter increases at one longitudinal end of pinion gear 72 to define a counterbore 98 configured to receive a head of fastener 82. The inner diameter is greatest at the other longitudinal end of gear 72 where gear 72 defines a recess 100 configured to receive a portion of clutch ring 74. Referring to FIG. 4, pinion gear 72 defines a circumferential rib 102 on a radially inner surface of pinion gear 72 within recess 100. Rib 102 has angular drive faces at either circumferential end for a purpose described below. Rib 102 is split to define a notch configured to receive one tang of torsion spring 76.

Clutch ring 74 forms one part of a one-way clutch. Clutch ring 74 is disposed within bore 30 of housing 12. Clutch ring 74 may be disposed about, and centered about, axis 36 and may be fixed against movement along axis 36. Clutch ring 74 is configured for rotation with pinion gear 72. Referring to FIG. 3, one longitudinal end portion 104 of clutch ring 74 is configured to be received in recess 100 in pinion gear 72. Portion 104 defines a circumferential rib 106 that is disposed within a common plane with rib 102 in pinion gear 72 such that rib 106 is disposed circumferentially between the circumferential ends of rib 104 in pinion gear 72. Rib 106 has angular drive faces at either circumferential end of rib 106 that are configured to engage corresponding opposing drive faces on rib 102 in pinion gear 72. In accordance with one aspect of the disclosed structure, rib 106 in clutch ring 74 and rib 102 in pinion gear 72 are sized to establish a gap between corresponding drive faces on ribs 102, 106 corresponding to the desired clearance between the friction linings and friction surface in the brake. Portion 104 defines a notch configured to receive one tang of torsion spring 76. The opposite longitudinal end portion 108 of clutch ring 74 is configured to abut one end of control worm screw 78 and defines a radially inner surface configured for engagement with a portion of wrap spring 80 for a purpose described below.

Torsion spring 76 couples pinion gear 72 and clutch ring 74 and maintains engagement between the corresponding drive faces in ribs 102, 106, in pinion gear 72 and clutch ring 74 during application of the vehicle brake. Spring 76 has tangs at either end that extending into corresponding notches formed in pinion gear 72 and clutch ring 74.

Control worm screw 78 forms another part of the one-way clutch and drives control worm wheel 84. Control worm screw 78 is disposed within bore 30 in housing 12. Screw 78 may be disposed about, and centered about, axis 36 and may be fixed against movement along axis 36. Screw 78 annular in shape. Screw 78 includes one or more helical threads 110 on a radially outer surface configured to mesh with corresponding teeth in control worm wheel 84. Referring to FIG. 5, control worm screw 78 defines a radially inner surface configured for engagement with a portion of wrap spring 80 for a purpose described below.

Figure 6:
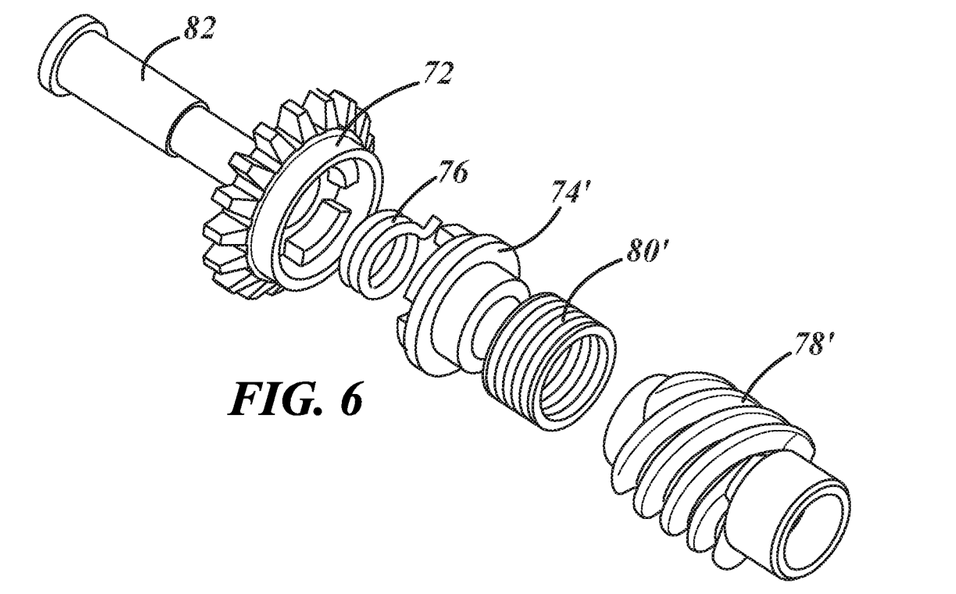
FIG. 6 is an exploded view of a portion of another embodiment of a wear adjustment mechanism for an automatic slack adjuster.
Figure 7:
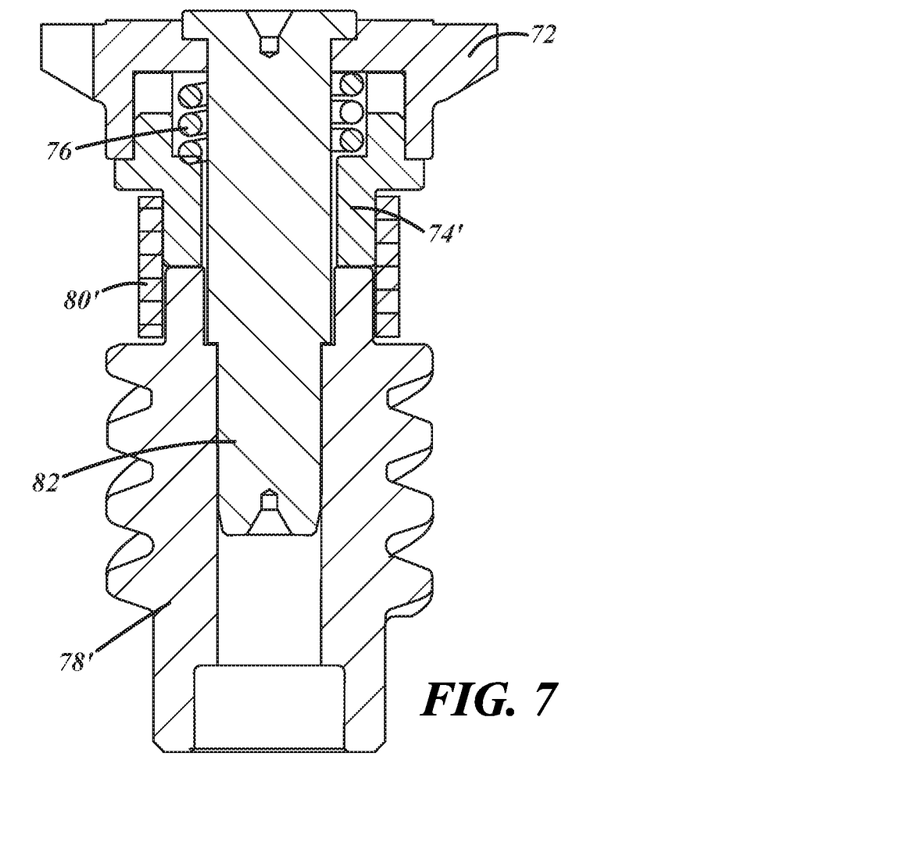
FIG. 7 is a cross-sectional view of the portion of the wear adjustment mechanism shown in FIG. 6.

Wrap spring 80 cooperates with clutch ring 74 and control worm screw 78 to form a one-way clutch. In particular, when clutch ring 74 rotates in one direction, spring 80 expands and increases the friction between spring 80 and the inner surfaces of clutch ring 74 and worm screw 78 to prevent relative rotation between clutch ring 74 and worm screw 78. When clutch ring 74 rotates in the opposite direction, spring 80 contracts, thereby decreasing the friction between spring 80 and the inner surfaces of clutch ring 74 and worm screw 78 to allow relative rotation between clutch ring 74 and worm screw 78. In the embodiment illustrated in FIGS. 3-5, wrap spring 80 engages radially inner surfaces of clutch ring 74 and control worm screw 78. Referring to FIGS. 6-7, in an alternative embodiment, a modified clutch ring 74' and control worm screw 78' are provided and wrap spring 80' engages radially outer surfaces of clutch ring 74' and control worm screw 78'. Clutch ring 74' and control worm screw 78' may otherwise be similar in construction to clutch ring 74 and control worm screw 78 described above. When clutch ring 74' rotates in one direction, spring 80' expands and decreases the friction between spring 80' and the outer surfaces of clutch ring 74' and worm screw 78' to allow relative rotation between clutch ring 74' and worm screw 78'. When clutch ring 74' rotates in the opposite direction, spring 80' contracts, thereby increasing the friction between spring 80' and the outer surfaces of clutch ring 74' and worm screw 78' to prevent relative rotation between clutch ring 74' and worm screw 78'. The use of wrap spring 80 enables slack adjuster 10 to perform continuous adjustment as opposed to being limited to discrete adjustments as in conventional slack adjusters employing toothed one-way clutches.

Referring again to FIGS. 3-5, fastener 82 supports pinion gear 72, clutch ring 74, torsion spring 76, control worm screw 78 and wrap spring 80 and maintains the alignment of these components. Fastener 82 has a shank 112 that extends through pinion gear 72, clutch ring 74, torsion spring 76, and wrap spring 80 and into one end of control worm screw 78. Referring to FIG. 5, the diameter of shank 112 varies to define a shoulder that abuts against a corresponding shoulder formed in control worm screw 78. Fastener 82 has a head 114 at one longitudinal end that is configured to engage pinion gear 72 and to be received within counterbore 98 formed within pinion gear 72.

Referring again to FIGS. 1-2, control worm wheel 84 is provided to adjust the position of driving worm screw 16 (and therefore, driving worm wheel 14 and the brake cam shaft) when the clearance between the friction linings and friction surfaces exceeds a predetermined clearance. Control worm wheel 84 is disposed within bore 32 and may be disposed about, and centered about, axis 38. Control worm wheel 84 is in mesh with control worm screw 78. Control worm wheel 84 is also configured for rotation with driving worm screw 16 under certain operating conditions as described below. Referring to FIG. 2, control worm wheel 84 is supported on one end of driving worm screw 16 and may be retained thereon by fastener 60. Control worm wheel 84 may further define a clutch with fastener 60 for selective coupling of driving worm screw 16 and control worm wheel 84. In particular, control worm wheel 84 may define a plurality of teeth on the side facing fastener 60 that are shaped in complementary manner to corresponding teeth on fastener 60. The forces exerted by spring 62 on driving worm screw 16 bias fastener 90 towards engagement with control worm wheel 84 to engage the clutch. Wheel 84 further defines one or more teeth on a radially outer surface configured to mesh with the threads on control worm screw 78. In the illustrated embodiment wheel 84 comprises a throated or enveloping worm wheel 84 in which the teeth increase in diameter moving from a longitudinal center of each tooth towards the longitudinal ends of the tooth.

Thrust bearing 86 permits rotation of control worm wheel 84 relative to housing 12. Thrust bearing 86 may be supported on driving worm screw 16 and may be configured for rotation with driving worm screw 16 by forming the radially inner surface of thrust bearing 86 and the radially outer surface of worm screw 16 with complementary shapes (e.g., key/keyway, flats, etc.).

Slack adjuster 10 operates in the following manner. During application of the brake, the brake actuator extends a push rod. Because the push rod is connected to arm 44 of housing 12, housing 12 is caused to rotate about axis 34. Housing 12 carries driving worm screw 16. Because of the engagement of driving worm screw 16 and driving worm wheel 14, rotation of housing 12 thereby results in rotation of driving worm wheel 14 about axis 34. Because driving worm wheel 14 is coupled to the brake cam shaft, this action causes the cam shaft to also rotate about axis 34 to urge a pair of brake shoes bearing friction linings towards the friction surface in a brake drum. The rotation of housing 12 also results in rotation of pinion gear 72 about axis 36 as it rides along stationary control ring gear 92. Referring to FIGS. 4-5, during application of the brake, one set of angular drive faces on ribs 102, 106 in pinion gear 72 and clutch ring 74 are in engagement. Therefore, rotation of pinion gear 72 also results in rotation of clutch ring 74 about axis 36. When clutch ring 74 rotates in this direction, wrap spring 80 is deformed in a manner that reduces the friction between wrap spring 80 and clutch ring 74 and control worm screw 78 and, therefore, clutch ring 74 rotates relative to, or freewheels relative to, control worm screw 78. Referring again to FIGS. 1-2, once the friction linings of the brake engage the friction surface, a reaction load is transmitted through the brake cam shaft and driving worm wheel 14 to driving worm screw 16. This load overcomes the force of spring 62 and causes movement of driving worm screw 16 and fastener 60 (to the right in FIG. 2) thereby disengaging the clutch between driving worm screw 16 and control worm wheel 84. Referring to FIGS. 3-5, pinion gear 72 and clutch ring 74 continue to rotate in a freewheel direction relative to control worm screw 78. As the brake is released, pinion gear 72 begins to rotates in the opposite rotational direction about axis 36 as it rides along stationary control ring gear 92 in the opposite direction. The tension in torsion spring 78 causes rotation of clutch ring 74 about axis 36 in the same direction as pinion gear 72. Rotation of clutch ring 74 in this direction deforms wrap spring 80 in a manner that increases the friction between wrap spring 80 and clutch ring 74 and control worm screw 78 thereby engaging the one-way clutch between clutch ring 74 and control worm screw 78. As a result, control worm screw 78 and control worm wheel 84 are caused to rotate about axis 36 in the same direction. Referring to FIGS. 1-2, once the friction linings disengage from the friction surface, the reaction load on driving worm screw 16 decreases and spring 62 again causes movement of driving worm screw 16 and fastener 60 (to the left in FIG. 2) to engage the clutch between driving worm screw 16 and control worm wheel 84. This action prevents further relative rotation between driving worm screw 16 and control worm wheel 84. Pinion gear 72 continues to rotate relative to control ring gear 92, but clutch ring 74 is prohibited from further rotation as a result of the connection to control worm wheel 84 through control worm screw 78 and wrap spring 80. Therefore, pinion gear 72 rotates relative to clutch ring 74 until the other angular drive faces on ribs 102, 106 in pinion gear 72 and clutch ring 74 engage. Further rotation of pinion gear 72 causes rotation of clutch ring 74, control worm screw 78, control worm wheel 84, and driving worm screw 16. Rotation of driving worm screw about axis 38 causes driving worm screw 16 to move about the circumference of driving worm wheel 14 thereby adjusting the position of slack adjuster 10 relative to the brake cam shaft. As a result, when the brake actuator pushrod returns to its original rest position, the brake cam shaft rotates through a reduced angle to a new rest position to decrease the distance (or take up the slack) between the friction linings and friction surface to the predetermined clearance.

An automatic slack adjuster 10 for a vehicle brake in accordance with the invention represents an improvement as compared to conventional slack adjusters. In particular, the inventive slack adjuster locates the one-way clutch 74, 78, 80 in a part of the wear adjustment mechanism 18 of the slack adjuster distant from the interface between the driving worm screw 16 and control worm wheel 84 of the adjustment mechanism. As a result, design and manufacturing of the slack adjuster is simplified and loads on the clutch are reduced. Further, the use of a wrap spring 80 in place of a toothed clutch allows for continuous adjustment as opposed to discrete adjustments as in conventional slack adjusters.

While the invention has been shown and described with reference to one or more particular embodiments thereof, it will be understood by those of skill in the art that various changes and modifications can be made without departing from the spirit and scope of the invention.

What is claimed is:

1. An automatic slack adjuster for a vehicle brake, comprising:
    a housing configured for coupling to a brake actuator;

a driving worm wheel supported by the housing and configured to engage a brake cam shaft of the vehicle brake;

a driving worm screw supported by the housing and in mesh with the driving worm wheel, the driving worm screw configured to transfer a brake actuating force, imparted by the brake actuator to the housing, to the driving worm wheel and brake cam shaft; and, a wear adjustment mechanism including a reference arm assembly configured to be fixed against movement and including a control ring gear;

a pinion gear in mesh with the control ring gear and configured for rotation about a rotational axis, the pinion gear defining a first angular drive face;

a clutch ring disposed about the rotational axis and configured for rotation with the pinion gear, the clutch ring defining a second angular drive face disposed within a common plane with the first angular drive face of the pinion gear and spaced from the first angular drive face of the pinion gear by an angular gap corresponding to a predetermined clearance between a friction lining of the vehicle brake and a friction surface of the vehicle brake;

a control worm screw disposed about the rotational axis;

a wrap spring engaging surfaces of the clutch ring and control worm screw; and, a control worm wheel in mesh with the control worm screw and configured for rotation with the driving worm screw.

2. The automatic slack adjuster of claim 1 wherein the pinion gear, clutch ring and control worm screw are fixed against movement along the rotational axis.

3. The automatic slack adjuster of claim 1 wherein the wear adjustment mechanism further comprises a fastener extending through the pinion gear, clutch ring and control worm screw, the fastener having a head configured to engage the pinion gear.

4. The automatic slack adjuster of claim 1 wherein the pinion gear defines a first circumferential rib defining the first angular drive face and a third angular drive face at opposite circumferential ends of the first circumferential rib and the clutch ring defines a second circumferential rib defining the second angular drive face and a fourth angular drive face at opposite circumferential ends of the second circumferential rib, the first angular drive face of the first circumferential rib configured to engage the second angular drive face of the second circumferential rib during rotation of the pinion gear in a first rotational direction about the rotational axis and the third angular drive face of the first circumferential rib configured to engage the fourth angular drive face of the second circumferential rib during rotation of the pinion gear in a second rotational direction about the rotational axis, opposite the first rotational direction.

5. The automatic slack adjuster of claim 1, wherein the wear adjustment mechanism further comprises a torsion spring having a first end coupled to the pinion gear and a second end coupled to the clutch ring.

6. The automatic slack adjuster of claim 1 wherein the surfaces of the clutch ring and control worm screw comprise radially inner surfaces of the clutch ring and control worm screw.

7. The automatic slack adjuster of claim 1 wherein the surfaces of the clutch ring and control worm screw comprise radially outer surfaces of the clutch ring and control worm screw.

8. An automatic slack adjuster for a vehicle brake, comprising:

a housing configured for coupling to a brake actuator;

a driving worm wheel supported by the housing and configured to engage a brake cam shaft of the vehicle brake;

a driving worm screw supported by the housing and in mesh with the driving worm wheel, the driving worm screw configured to transfer a brake actuating force, imparted by the brake actuator to the housing, to the driving worm wheel and brake cam shaft; and, means for adjusting a position of the driving worm wheel to compensate for wear in the vehicle brake.

9. The automatic slack adjuster of claim 8 wherein the adjusting means comprises:

a reference arm assembly configured to be fixed against movement and including a control ring gear;

a pinion gear in mesh with the control ring gear and configured for rotation about a rotational axis, the pinion gear defining a first angular drive face;

a clutch ring disposed about the rotational axis and configured for rotation with the pinion gear, the clutch ring defining a second angular drive face disposed within a common plane with the first angular drive face of the pinion gear and spaced from the first angular drive face of the pinion gear by an angular gap corresponding to a predetermined clearance between a friction lining of the vehicle brake and a friction surface of the vehicle brake;

a control worm screw disposed about the rotational axis;

a wrap spring engaging surfaces of the clutch ring and control worm screw; and, a control worm wheel in mesh with the control worm screw and configured for rotation with the driving worm screw.

10. The automatic slack adjuster of claim 9 wherein the pinion gear, clutch ring and control worm screw are fixed against movement along the rotational axis.

11. The automatic slack adjuster of claim 9 wherein the adjusting means further comprises a fastener extending through the pinion gear, clutch ring and control worm screw, the fastener having a head configured to engage the pinion gear.

12. The automatic slack adjuster of claim 9 wherein the pinion gear defines a first circumferential rib defining the first angular drive face and a third angular drive face at opposite circumferential ends of the first circumferential rib and the clutch ring defines a second circumferential rib defining the second angular drive face and a fourth angular drive face at opposite circumferential ends of the second circumferential rib, the first angular drive face of the first circumferential rib configured to engage the second angular drive face of the second circumferential rib during rotation of the pinion gear in a first rotational direction about the rotational axis and the third angular drive face of the first circumferential rib configured to engage the fourth angular drive face of the second circumferential rib during rotation of the pinion gear in a second rotational direction about the rotational axis, opposite the first rotational direction.

13. The automatic slack adjuster of claim 9, wherein the wear adjusting means further comprises a torsion spring having a first end coupled to the pinion gear and a second end coupled to the clutch ring.

14. The automatic slack adjuster of claim 9 wherein the surfaces of the clutch ring and control worm screw comprise radially inner surfaces of the clutch ring and control worm screw.

15. The automatic slack adjuster of claim 9 wherein the surfaces of the clutch ring and control worm screw comprise radially outer surfaces of the clutch ring and control worm screw.

* * * * *